June 17, 1958

C. F. HIGH 2,839,040

FUEL INJECTOR APPARATUS FOR
INTERNAL COMBUSTION ENGINE

Filed Dec. 29, 1954

INVENTOR.
CARL F. HIGH

BY
Hawke & Hardesty
ATTORNEYS

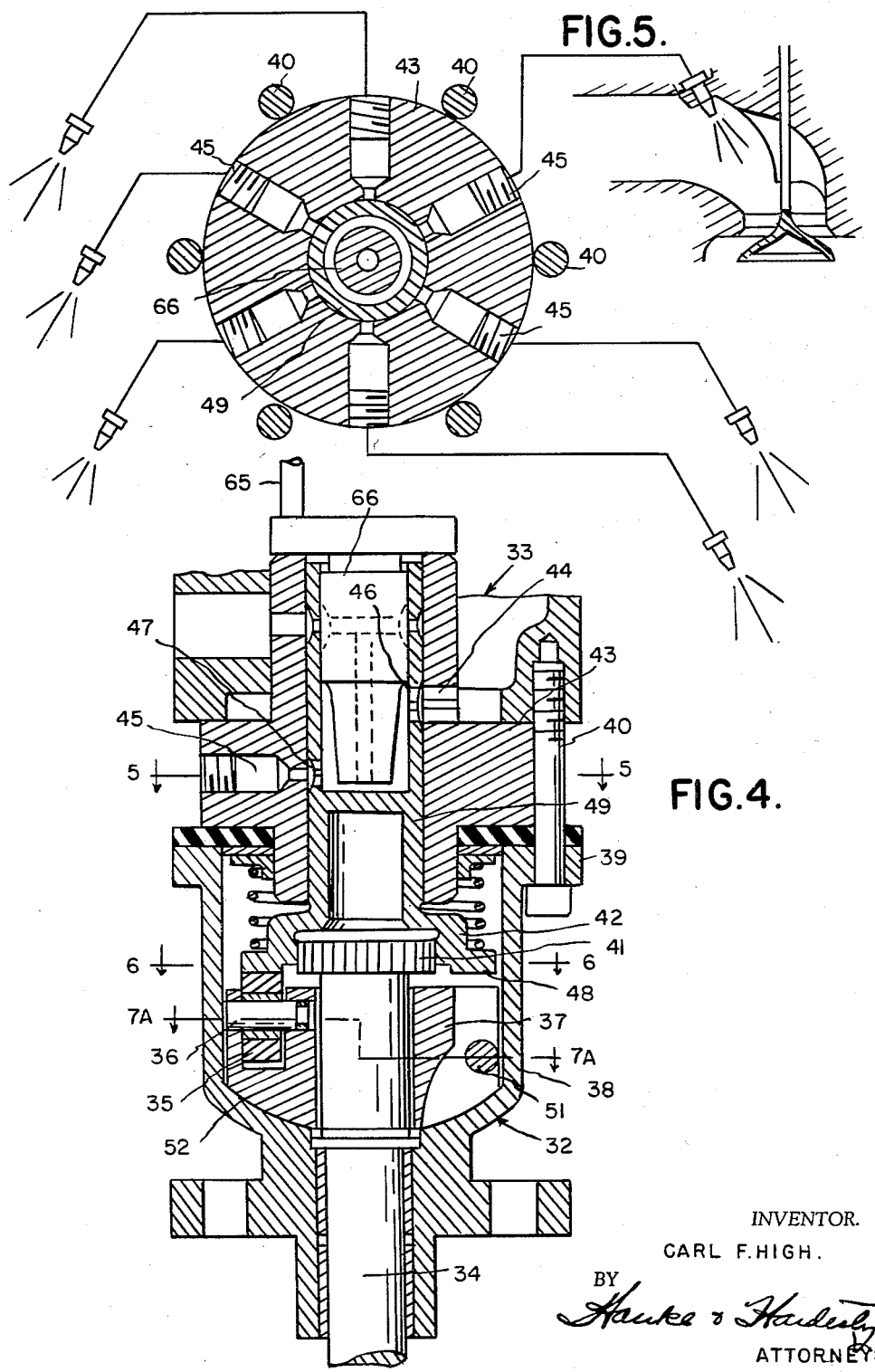

June 17, 1958 C. F. HIGH 2,839,040
FUEL INJECTOR APPARATUS FOR
INTERNAL COMBUSTION ENGINE
Filed Dec. 29, 1954 6 Sheets-Sheet 4

INVENTOR.
CARL F. HIGH
BY
ATTORNEYS

June 17, 1958
C. F. HIGH
2,839,040
FUEL INJECTOR APPARATUS FOR
INTERNAL COMBUSTION ENGINE
Filed Dec. 29, 1954
6 Sheets-Sheet 5
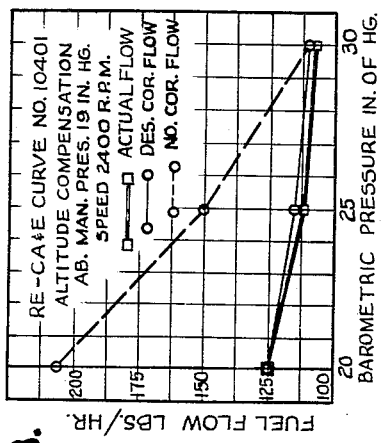
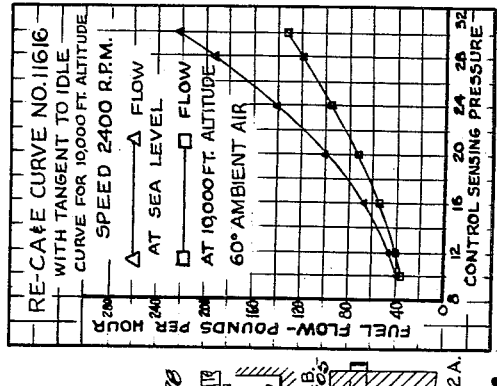
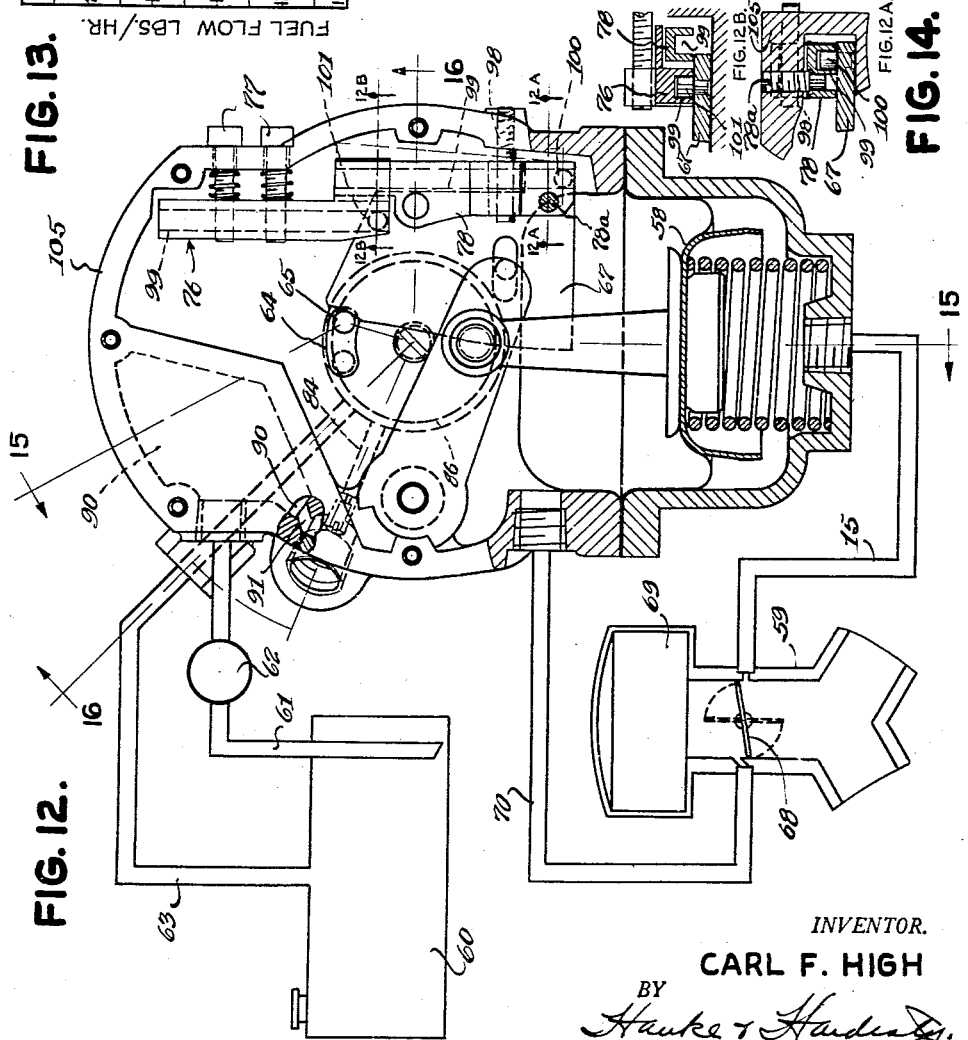
INVENTOR.
CARL F. HIGH
BY
Hauke & Harding
ATTORNEYS

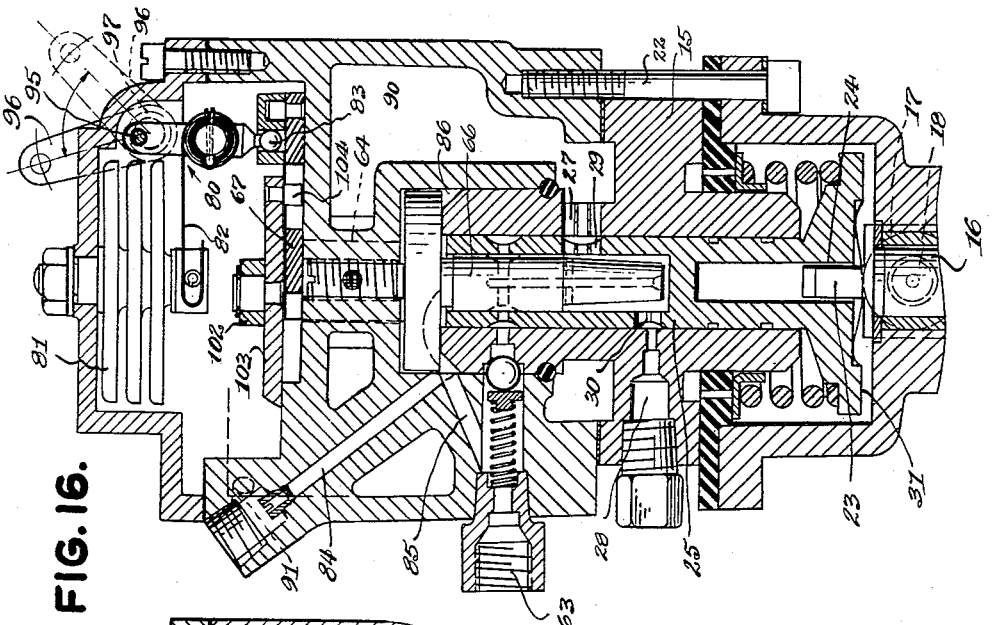

United States Patent Office 2,839,040
Patented June 17, 1958

2,839,040

FUEL INJECTOR APPARATUS FOR INTERNAL COMBUSTION ENGINE

Carl F. High, Detroit, Mich.

Application December 29, 1954, Serial No. 478,250

16 Claims. (Cl. 123—140)

This invention relates to a fuel injector and more particularly to an improved fuel metering system therefor embodying a control sensitive to engine speed and other engine operational variables whereby to provide for best and highest engine efficiency under all conditions of engine operation. More particularly the present invention is adapted to be applied to a speed-density controlled pump of the type shown in a copending application for patent, Ser. No. 454,274, filed Sept. 7, 1954, and also utilizes an injection nozzle as described in United States Letters Patent No. 2,665,167, issued Jan. 15, 1954.

An ideal fuel delivery curve may be worked out for any specific engine or series of engines, and where some engine operational variables in actual practice tend to alter or vary the fuel delivery away from the ideal, then this invention makes it possible to corect for this variation in order to more closely match the actual delivery with the ideal fuel delivery as required by the engine for all engine speeds.

As a logical starting point, the calibration of the speed-density controlled pump has its inception in a pump displacement selected for the cylinder displacement of the internal combustion engine to be served. The bore-stroke displacement of the pump is increased at least ten percent over that which is required for the full-throttle fuel for the engine which it is to supply. With a plunger diameter selected for a wide range of engines, the plunger stroke is then varied to accommodate engines of specific displacement. An exception to this rule would be for engines intended for operation at extremely high speeds, for such engines the plunger stroke would be held to a minimum, to lessen the inertia loading, and the plunger diameter increased to supply the amount of fuel which would be needed. In both instances the bore-stroke ratio would remain the same as the pump displacement and fuel delivery would be unaltered.

After having produced a pump of correct bore-stroke ratio for a line of engines of a particular displacement, the next step would be to design the contour of the fuel-air cam intended to supply the fuel needed to burn the air inducted by the engine. With a selection of spray nozzles with approximately the correct area of fixed orifice, to limit the pressure at full throttle and highest speed, the equipment is ready for the installation upon a test-stand. Air presusre and vacuum equipment, to simulate intake manifold pressures, must be available for the tests.

With the pump installed and running on the test stand at a constant speed, the intake-manifold sensing pressure can be applied to the density control and the fuel delivery noted. The fuel-air cam is then manually adjusted to most nearly meet the fuel requirements of the engine at that sensing pressure and pump speed. The fuel delivery and maximum p. s. i. at the nozzles is also checked at the maximum operating speed. The fuel-air cam, which had been developed from computation, can then be accurately contoured to exactly meet the definite fuel demand curve of the engine at that selected speed.

It is customary to calibrate an engine and to determine the ideal fuel delivery curve by selecting some initial engine speed, say 2000 R. P. M., and in the operation of an engine at other speeds above and below the selected speed necessitates correction and therefore means must be provided to achieve correct calibration throughout the speed and load range of the engine.

Thus one of the objects of the present invention is to overcome the difficulties described above by providing means whereby it is possible to selectively adjust or position the elements of the mechanism to modify the fuel delivery whereby to obtain an actual fuel delivery that closely matches the ideal fuel delivery curve for all engine speeds.

Another object of the present invention is to be provide an improved fuel injection apparatus for internal combustion engines, particularly of the gasoline injection type, by providing a closed system wherein the posibility of fuel vapor losses is kept to a minimum, and Still another object of my invention resides in the provision of an improved control means for adjusting the fuel metering valve, whereby to more efficiently meter the fuel for all engine speeds and for all conditions of engine operation.

For a more detailed understanding of my present invention reference may be had to the accompanying drawings illustrating preferred embodiments of my invention in which like characters are used to indicate like parts throughout the several views, and in which Fig. 1 is a vertical longitudinal sectional view taken substantially centrally through the drive and pumping elements of an assembled fuel injection pump constructed in accordance with the principles of the present invention, and taken substantially on the line 1—1 of Fig. 2.

Fig. 4 is a vertical longitudinal sectional view taken substantially through the drive and pumping portions of another type of fuel injection pump constructed in accordance to approved practice for great fuel capacity to serve a large displacement engine.

Fig. 5 is a sectional view taken substantially on the line 5—5 of Fig. 4.

Figure 11A:
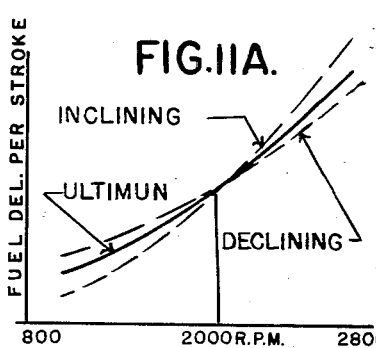
Fig. 11 shows port phasing for a declining fuel delivery curve.

Fig. 11A diagrammatically shows a curve representing the result of adjusting the pump for a declining or inclining fuel delivery curve.

Fig. 12 is a top plan view of the fuel injector with cover removed, partly in cross section and showing the manifold density unit which operates the fuel metering control.

Figs. 12A and 12B are detailed sectional views taken on the lines 12A—12A and 12B—12B of Fig. 12.

Fig. 13 is a curve showing altitude compensation and no corrected fuel flow in pounds per hour plotted against barometric pressure.

Fig. 14 is a curve showing fuel flow in pounds per hour, plotted against control sensing pressure, with tangent to idle curve of reduced fuel flow for 10,000 feet of altitude.

Fig. 15 is a longitudinal sectional view taken substantially on the line 15—15 of Fig. 12.

Fig. 16 shows a cross sectional view on substantially the section 16—16 of Fig. 12 with full throttle cam guide and fuel air cam being shown in section.

Figure 8:
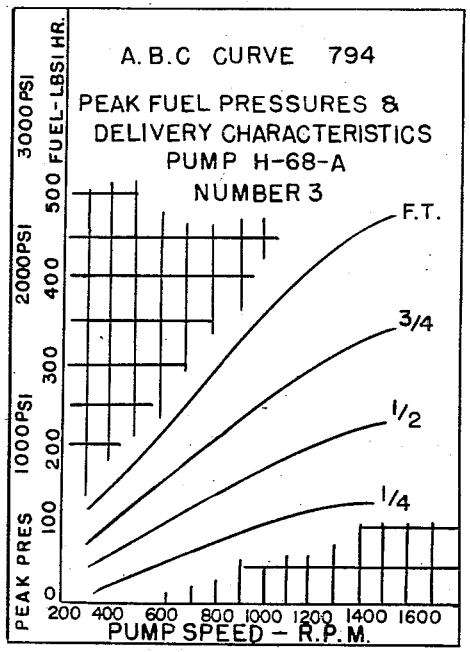
Fig. 8 shows curves of peak pressures and fuel delivery characteristics.
Figure 9:
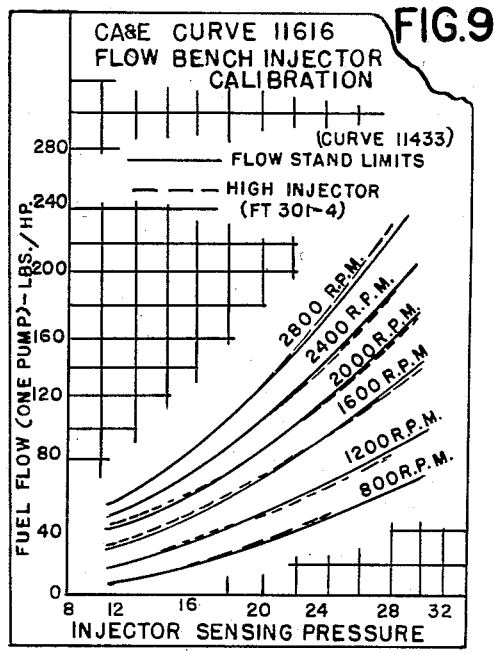
Fig. 9 shows curves of engine fuel requirements and the conformity of the fuel calibration to these curves.

Referring to Fig. 9, which is an actual fuel demand curve for a large-bore engine, the initial speed selected was 2000 engine R. P. M. The injection pump sensing pressure was selected, Fig. 8 shows the actual curves of the bench test of the pump which had a top pressure of 2500 p. s. i. when delivering 475 pounds of fuel per hour at 2800 engine R. P. M. This top or maximum pressure of 2500 p. s. i. was reduced to approximately 1500 p. s. i. when the maximum delivery of fuel was reduced to 245 pounds of fuel per hour as shown on the curve in Fig. 9. This reduction in fuel delivery from 475 pounds per hour to 245 pounds per hour was obtained by simply reducing the lift of the face-cam on the end of the plunger by re-grinding. With both the quantity of fuel and the maximum fuel pressure at the nozzles within reasonable range, the calibration at all speeds could then proceed.

At the selected speed of 2000 R. P. M., and at the check points of the absolute manifold pressure as applied to the control mechanism, the fuel-air cam was accurately contoured and finely adjusted. To accurately contour the working edge of the cam, excess metal is removed from any point or area which positions the metering valve to deliver too much fuel at the density-set position. With the original or master fuel-air cam thus hand developed or contoured serving as a template, the master contour is then transferred to or duplicated on cams for subsequent pumps. With the master fuel-air cam thus developed to exact engine requirements at 2000 engine R. P. M., the other speeds above and below 2000 engine R. P. M. are run. It is in the running of these speeds other than the base 2000 engine R. P. M. that the necessity of the "instant" invention becomes evident. The necessity of the invention is most evident for speeds above and below 2000 R. P. M. The fuel must automatically be delivered on the curves of engine requirements or means must be provided to make it do so to achieve correct calibration throughout the speed and load range of the internal combustion engine.

Early in the development of the gasoline injection pumps and nozzles, the fly-ball governor and the retracting fuel delivery valve were rejected as impractical for meeting the speed requirements of an engine. Geometrical designing of spill ports, to provide gradual or sudden cut-off of spilled fuel, was also considered insufficient to meet the wide speed range of an automotive engine. As our gasoline injection pumps are arranged to spill the first portion of the discharge stroke and deliver through the nozzles the latter portion of the fuel being displaced on that stroke, it follows that there is an increasing fuel pressure throughout the early part of the fuel delivery and a declining of the pressure wave only after the plunger has passed the high-point of the cam. Early developments indicated that the speed characteristic might be a function of the amount spilled versus the amount delivered, as affected by a pressure rise due to port design or port restriction, but this was only partially true. In a pump using a check valve for resisting the fuel passing through the spill port was tried, but its use was also found to offer an incomplete answer. The most complete answer has been found in the rearranging of the pumping elements involved and the "instant" invention acknowledges this fact and applies means to effect this re-arrangement.

With gasoline fuel injection pumps having the cam on the end of a plunger which constantly rotates, the cam causes constant plunger reciprocation for pumping as the plunger constantly rotates for valving. The metering valve is in turn positioned so that the end of fuel delivery is near to or over the high-point, or nose, of the cam. As the early part of fuel delivery is on an increasing pressure wave and the part of the delivery over the nose of the cam is on a descending pressure wave, there is in this varying pressure the usable factor to modify the speed curve. By arranging more of the delivery on the ascending pressure wave and less on the declining pressure wave, by moving the high point of the cam to a later position, there will be more of the peak pressure to pass fuel as film-leakage around the plunger to leak through the intake ports and the delivery curve will decline. With the restricting orifices of the spray nozzles also building up increased pressure as the speed increases, due to the reduced time that the fuel must pass through the orifice as the speed increases, the declination of the curve of delivered fuel increases with speed. With fixed orifice nozzles, it is only necessary to move the porting of the pump against rotation a few degrees, or against the pressure rise before the top dead-center, or high-point, of the cam, to make the fuel delivery curve decline. Inversely, moving a few degrees with the pressure wave, or later than top center or high point of the cam, will make the fuel delivery curve incline. Thus the port positioning of the pump, in relation to the rise and fall of the pressure wave of discharging fuel, will modulate the inclination, horizontal or straight-line delivery, or declination of the fuel delivery curve.

Figure 10:
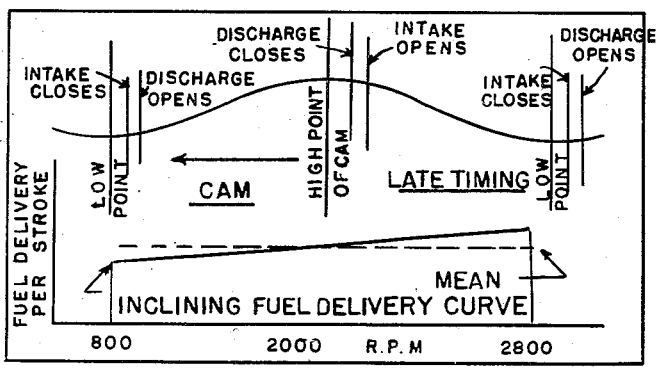
Fig. 10 shows port phasing for an inclining fuel delivery curve.

Fig. 10 shows how a port cut-off during the late, or pressure decrease, portion of the discharge stroke results in an inclining fuel delivery curve.

Figure 11:
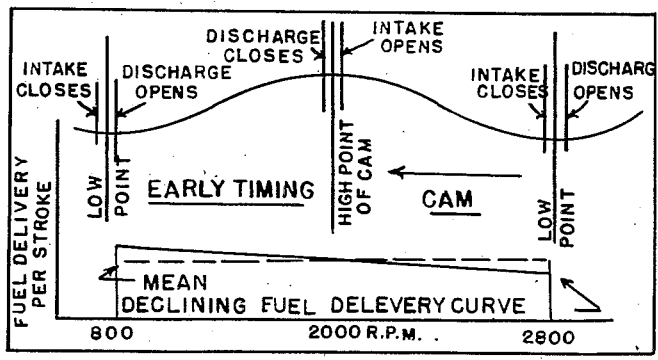

Fig. 11 shows how an early, or pressure increase, portion of the discharge stroke results in a declining curve.

Fig. 8 shows the droop of the delivery curves at the full throttle ends due to the build up of pressure on the fuel discharged through the nozzles. A loose fitting plunger, or a plunger worn loose by extensive usage, would aggravate this condition. The reason advanced for this delivery characteristic is that the fuel-film leakage into the band of intake ports is increased by cutting off, by continuous plunger rotation, the discharge port while the pressure wave is rising, hence the high-pressure fuel divides more to leakage and less to delivery through the nozzles and the delivery curve, which is the one in which we are interested, is declining. By arranging the port for later ont-of-registry or cut-off, the port remains open for a larger percent of fuel to be delivered through the nozzles, with the intake ports still farther down the declining pressure side of the cam, and the fuel-delivery curve is inclining. Thus, by varying the port position or phasing, in relation to the pressure wave of the fuel, which pressure wave is a function of the reciprocation of the plunger and the fixed spray orifices of the nozzles, the fuel delivery can be made to either incline, fall horizontal, or decline as the speed requirements of the engine demands.

Having calibrated the fuel injection pump on the test stand, to the fuel requirements of the engine, the timing of the pump to the engine is here briefly reviewed. With intake port injection, the timing of the pump, with fuel being delivered through the nozzle, is with the intake valve open as is shown in the port drawing of an engine which is a part of Fig. 5. Taking into account that the end of injection remains unchanged irrespective of throttle opening or spray duration, the start of injection moves forward in the cycle as the throttle opening and engine load increases. The pump timing, proved on many engines over a period of years, has been from 45° to 90° for end of injection after beginning of intake stroke. This figure is actually increased several degrees for the ending of spray, due to the lag through the hydraulic column, so the timing is always taken as the point of discharge-port cut-off of number one outlet, as seen through the opening for the tube connector, with all other outlets considered the same in their sequence. Connecting the other outlets from pump to engine is in sequence in the direction of plunger rotation at the pump and to the engine according to the firing order of the cylinders. With the distribution type of mounting shown, in Figs. 1 and 4, the mounting of the pump on the engine is a matter of timing the pump and timing the engine and simply slipping the spiral driver and driven gears together. It should be noted that with either pump shown, in Fig. 1 or in Fig. 4, on either the test stand or on the engine, the phasing of the ports to the lift of the cam can be effected without dismounting the pump. Thus the means of changing the fuel delivery curve without removing the pump from test stand or engine becomes one of the features of this invention.

With the speed-density control of the spill-metering type of fuel injection pump, the throttle opening and load are the engine's sensing means of knowing the exact quantity of fuel required to burn the volume of air being inducted at the moment. Disregarding the barometer and air temperature, the density of the air in the intake manifold is wholly a function of load as all engine speeds are possible at all throttle openings. In other words, at all throttle openings the R. P. M.'s or speed of the engine depends wholly upon the load imposed upon the engine at that moment. Thus the two factors of speed and density bear an equal importance in the control mechanism which is intended to meet the fuel-metering requirements of a fuel-injection system. Considered here will be only the speed factor of the equation.

Considering the mathematics of the speed factor, the general velocity equation for water flowing from an orifice, is as follows: "Velocity equals the square root of 2 × gravity × head." Although in this instance we are dealing with a divided flow against gravity; namely, the unidirectional fuel delivery through the nozzles and the unidirectional fuel flow as film leakage around the plunger and through the intake ports, the square root of the head, or pressure factor, in the equation should still apply.

Deriving the head or pressure factor for the fixed orifice nozzle, we know that with 75 p. s. i. required on the fuel to open the piston type valve in the nozzle, an orifice area beyond the nozzle valve may be selected so that at full-throttle, operating through a speed range from 350 to 3150 pump R. P. M., or nine times the initial speed with each injection passing through the nozzle orifice in one-ninth the initial time, the pressure rise will be as the square-root of nine. Thus, if an initial full-throttle pressure of 1000 p. s. i. is selected, the final full throttle pressure will be 3000 pounds per square inch. This threefold increase of pressure, transferred back through pump displacement, will cause theoretically 1.732 times as much fuel-film leakage, around the plunger and through the intake ports, as previously.

With a definite increase of pressure induced by speed, there is thus a definite factor which may be employed to modify the fuel delivery curve through the speed range. By varying the length of path for fuel-film leakage to the band of intake ports, and particularly by moving the leakage path in closed proximity to the crest of the pressure-wave caused by pump delivery, the amount of fuel delivered through the nozzles can be made to increase or decrease, in the amount that the fuel-film leakage is decreased or increased, as the sum of the two equals unity. Although the modification of the fuel delivery curve, by the spill-port or spill-port valve, is still possible, it is the inability of the spill-port or spill-valve to meet all speed conditions, particularly those of very high-speed engines, which is met, by utilizing the pressure increase as credited by the spray orifices of the nozzles in the present invention. Modifying the spray nozzles for engines of other displacement or operational characteristics, is a function of the area of the spray orifices. Within the nozzles, plus the ability to locate the pump porting in certain relationship to the pressure wave of fuel delivery, resides one salient feature of the present invention.

Another salient feature of this present invention resides in providing two guide bars for the fuel-air cam, with separate adjustments for each bar leading outside the pump so that adjustments may be made while running. One of the two guide bars is connected, through its lengthwise slot in which a pin-type follower slides, to the fuel-air cam with the pin-follower located near its idling end. The other guide bar is connected, through its lengthwise slot in which a second pin-type follower slides, to the fuel-air cam with the pin follower located near its full throttle end. Thus the adjustment of the idling end guide bar will alter only the idling quantity of fuel and will thus be the known idling adjustment. The adjustment of the full-throttle end guide bar will be both manual and automatic with the manual adjustment residing in the fulcrum of the aneroid-temperature unit and the automatic adjustment residing in the expansion of the aneroid, as lower atmospheric pressures are encountered, and the bending of the bi-metal arm as higher temperatures are encountered. With either manual or automatic adjustment of the full-throttle guide bar, the fuel curve fans out from the idle setting so that safe idling proportion of fuel to air is preserved while the fuel to air is reduced proportionally to full throttle as lower air pressures, or higher air temperatures, are encountered in the operation of the engine.

Figure 2:
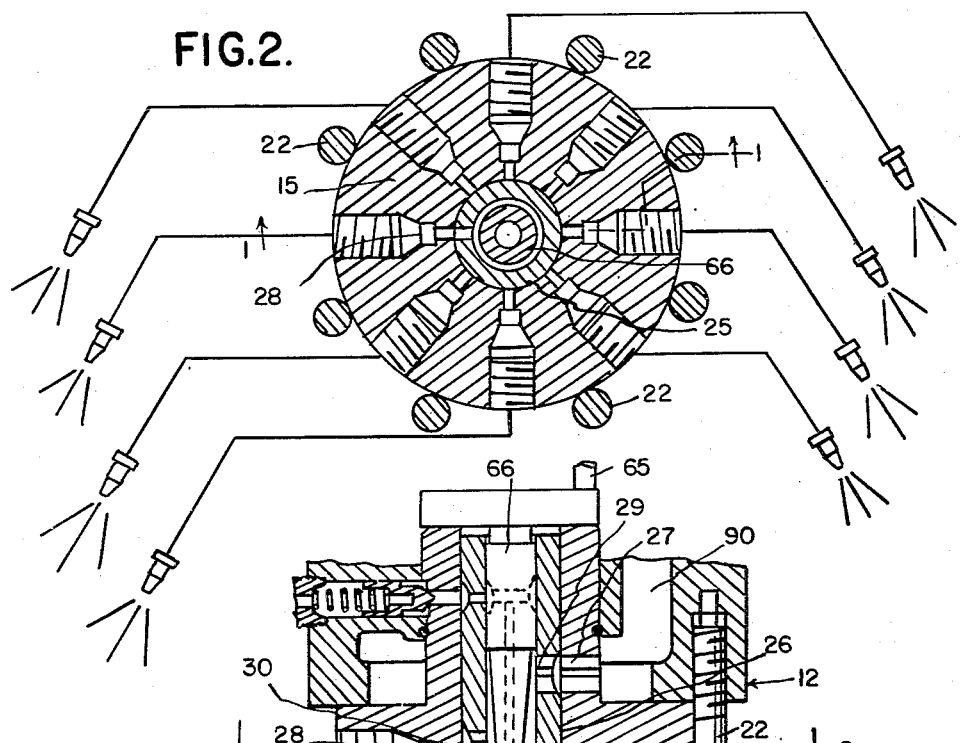
Fig. 2 is a sectional view taken substantially along the line 2—2 of Fig. 1.
Figure 1:
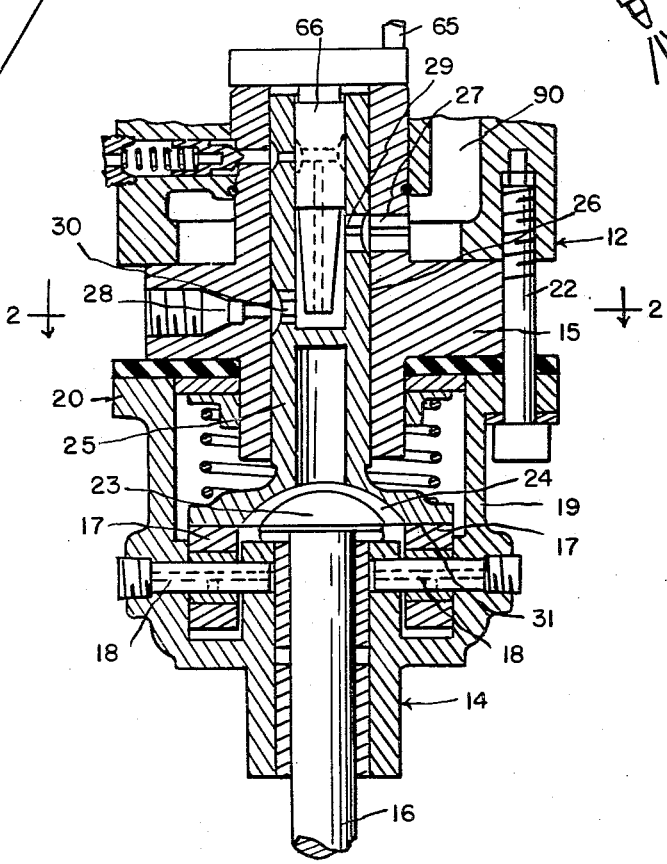

Referring now to the several views of the drawings, and at this time particularly to Fig. 1, the fuel injection apparatus 12 comprises a drive section 14 and a pumping section 15 mounted thereon. The drive section 14 comprises a drive shaft 16, a roller which serves as a cam follower 17, which rotates on a pin 18 all mounted in the base casing 19. The base casing 19 is shown with a distributor mounting and at the opposite end there is a flange which has elongated holes 21 by means of which the base is adjustably attached to the pumping section 15 by means of the bolts 22. The drive shaft 16 ends in a tang 23 which is slidably mounted in a slot 24 in the base of the plunger 25 to effect its continuous rotation.

Pump section 15 is provided with a pump cylinder 26 with intake ports 27 and discharge ports 28 which register consecutively with their opposite plunger intake ports 29 and plunger discharge ports 30, as the plunger is rotated by shaft tang 23 engaging plunger slot 24. The face cam 31, on the end of plunger 25, reciprocates the plunger as it is rotated over roller followers 17.

Referring now to Fig. 4, comprising a drive section 32 and a pumping section 33. The drive section 32 comprises a drive shaft 34, a roller which serves as a cam follower 35, which rotates on pin 36 all mounted in a semi-spherical roller cage 37 which rests in a generally spherically socket in the base casting 38. The base casting 38 is shown with a distributor mounting 39 and at the opposite, or flanged end, it is rigidly attached to the pumping section 33 by means of bolts 40. The drive shaft 34 ends in a spline or gear 41 which is slidably mounted in a mating internal gear 42 in the end of the plunger to effect its continuous rotation.

Pump section 33 is provided with pump body 43 which has intake ports 44 and discharge ports 45 which register consecutively with their mating plunger intake ports 46 and plunger discharge ports 47, as the plunger is rotated by the drive-shaft gear 41 engaging the plunger by means of the internal mating gear 42. The face-cam 48, on the end of plunger 49, reciprocates the plunger as it passes over the fixed roller-follower 35 mounted in the semi-spherical roller cage 37 which is self aligning in the spherical socket 52 provided in the base casting of the pump.

Figure 6:
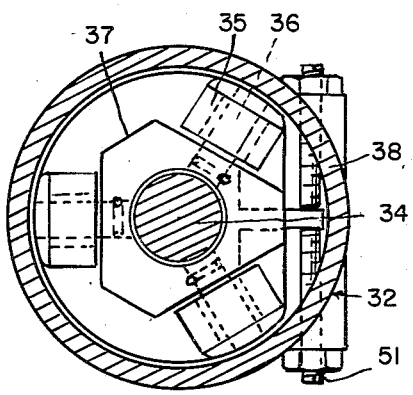
Fig. 6 is a sectional view taken substantially along the line 6—6 of Fig. 4.

Referring again to drive section 32, the roller cage 37 is held against rotation in the base socket 52 by the tangentially-mounted screws 51. Screws 51 hold the cage 37 against rotation with ample freedom to permit ready alignment so that the three roller-followers 35, shown in plan view in Fig. 6, carry equally the impact of three contacting lobes of the face-cam 48. The adjustability of screws 51, which are tangential to the axis of the cage, will rotate through eight or ten degrees the cage 37 and the rollers 35 mounted in it so that they engage the lobes of the face cam 48 earlier or later and thus change the phasing of the plunger lift to the valving of the ports and thus effect the desirable results which have been shown on the curves and described above.

Figure 3:
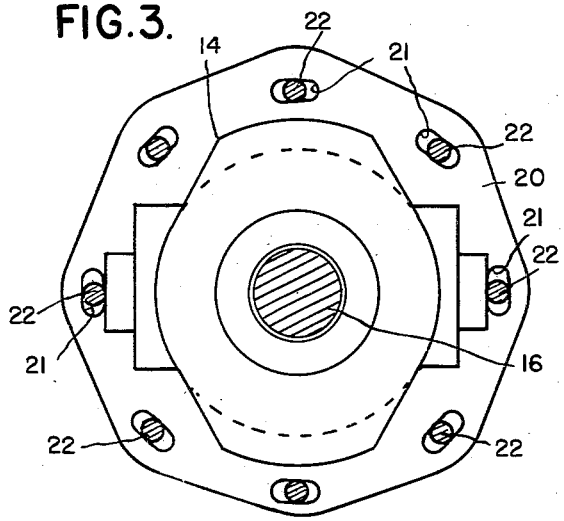
Fig. 3 is the bottom view of the complete pump shown in section in Fig. 1.
Figure 7:
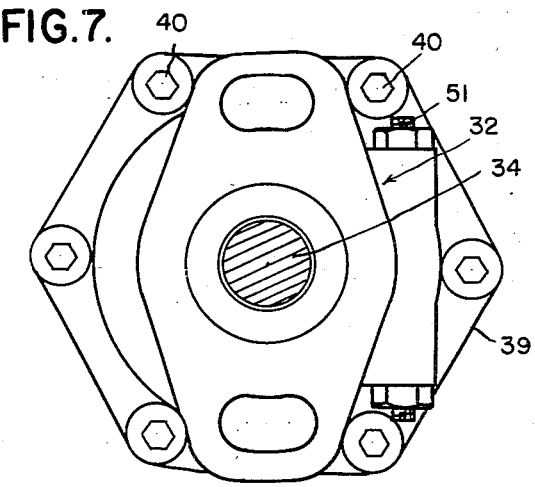
Fig. 7 is a bottom view of the complete pump of Fig. 4.
Figure 7A:
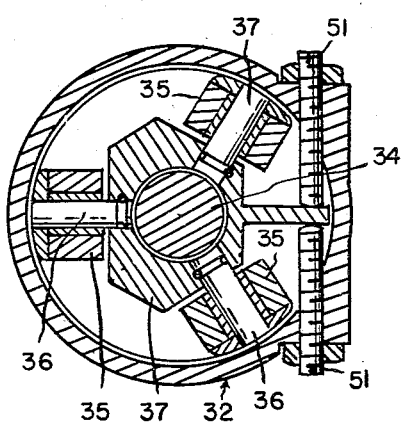
Fig. 7A is a sectional view taken substantially on the line 7A—7A of Fig. 4.

Summarizing the foregoing, with the pump mechanisms shown, the plunger reciprocating cam and the intake and discharge porting are integral with the pumping and fuel distributing plunger. Thus, by grinding the positioning of the cam in relationship to the ports, the relationship between cam and ports could be established. Certain characteristics of the pump do not favor such fixed relationship; thus, the advancing or retarding of the point of discharge-port cut-off, in relation to the pressure rise or pressure drop as created by the lift of the cam, is most desirable for the efficient calibrating of the pump. In Fig. 1, with reference to Fig. 3, the positioning of the roller followers is effected by moving the base, which carries the rollers, somewhere within the distance of the slotted holes in the flange of the base casting and clamping it in the desired position by tightening the body bolts. Somewhere within the range of advancement or retardation will be found the desired fuel-delivery characteristic. With the mechanism shown in Fig. 4, with special reference to Figs. 6 and 7, the roller-followers are contained in the roller cage 37 which is self-aligning and distributes equally the loads of three of the six cam-lobes. The repositioning of the roller-followers to the cam, around the axis of the plunger and its integral ports and cam, is by screws 51 or other fastening means. With either method of positioning the cam to the porting, in relation to the pressure rise of the fuel being delivered through nozzles 52, the desirable results pointed out remain the same.

Referring to Figs. 12 to 16 inclusive, it will be observed that the second and third salient features of this are shown. In these figures, connected to injector pump (Fig. 12) and integral therewith is a schematic view of the fuel and venting system as hereinafter described. Reference character 60 designates the fuel tank. The fuel supply tube 61 and the fuel supply pump 62 deliver fuel under pressure to the fuel injector pump. The fuel return tube 63 serves as the vent for the fuel tank, while 64 designates the fuel vent within the pump, which vent 64 is the clearance opening for the cam follower pin 65 of the metering valve 66 which contacts the fuel-air cam 67. Referring again to the schematic view of the fuel and venting system, 68 is the air throttle in the intake manifold 59 and 69 the air cleaner, and the atmospheric tube 70 lies between the air throttle and the pump. 15 designates the manifold density tube which connects the upper side of the control diaphragm or piston 58 to the intake manifold 59 downstream of the air throttle. 76 designates the idling end cam guide with the adjusting screws 77 while numeral 78 designates the cam guide for the full throttle end of the fuel air cam.

Fuel air bell-crank adjustment 80, with aneroid 81 and bi-metal arm 82 are also shown with manual adjustment of the automatic devices residing in the adjustable fulcrum 83. The fuel bleed 84 and the fuel return connector 85, which connects the drain tube 63, and the collector or channel 86, which circles the upper end of the pump body, are also shown. The vent 64 is shown schematically as clearance for metering pin 65 of the metering valve 66 in Fig. 15. This vent 64 serves as the connecting link between the fuel drain tube 63 and the atmospheric vent tube 70 with clearance around the head of the metering valve 66 completing the vent and drain circuit. The clearance serves only as a vent as the liquid fuel is all drained or discharged into the collector ring or channel 86 or directly into the tube 63.

It will be observed that the passage 84 is connected with the fuel inlet chamber 90 through the connecting passage 91, passage 85 connecting the drainage collecting channel 86 with the fuel return line or conduit 63 by way of the fuel spill passage 63 in the injector casing.

The fuel return line or conduit 63 and the vent line 70 are both double purpose conduits. The conduits 63 serve to vent any fuel vapor from the tank to said intermediate chamber and thence to the control chamber 94 through vent 64. The tube or conduit 70 connecting the control chamber 94 to the intake manifold 59 and the atmospheric side of the air throttle valve 68, serves as a vent for the control chamber and any fuel vapors which may thus escape are discharged into the intake manifold. The vent tube or conduit 70 also serves to maintain atmospheric pressures in said control chamber so that the aneroid 81 is at all times subjected to atmospheric pressures as exist around the engine. Temperatures within the injector influence the setting of bell crank lever assembly 80, as variations in such internal temperatures cause movement of the bi-metal arm 82 and thus automatically adjust the cam 67.

The bell crank 80 is pivoted as at 95 to an eccentrically adjusted pin, and an adjustment of this pivot or fulcrum may be manually had by means of lever 96 which may be moved as shown in Fig. 16 by the operator by any suitable means to rotate the mounting shaft 97 which eccentrically carries the pin 95.

The cam guide 78 is automatically adjusted by said crank 80 as heretofore described, and is slidably supported on pin 98, carried by the pump casing 105, as it rotates about pivot screw 78a carried by the pump casing 105, as shown in Fig. 12A. The location of this pivot 78a is determined by experimentation. This provides an automatic adjustment of the full-throttle control portion of the cam 67, through the cam guide 78. The lever 96 provides a manual adjustment of the cam guide 78, through the moving of the fulcrum pin 95, which manual adjustment augments the automatic adjustment or can be used in the event of failure to the automatic devices or in the event that the automatic devices, consisting of aneroid 81 or bi-metal arm 82, are eliminated.

Both of the cam guides 78 and 76 are provided with guide grooves 99 extending generally parallel to the direction of the movement of said cam 67 (see Figs. 12A and 12B) and the cam 67 carries a pin 100 which is guided in groove 99 of guide 78 and a pin 101 which is guided in groove 99 of guide 76. Adjustment of the guide controls the cam movement as same is moved in direct response to variations in pressure effecting the pressure responsive element 58. The cam 67 is connected to this pressure responsive element by link 102 pivoted to arm 103 and pin 104 in a manner similar to the construction described and claimed in said copending application Serial No. 454,274.

It will be apparent to those skilled in the art to which my invention pertains, that various changes may be made therein without departing from the spirit of my invention or from the scope of the appended claims.

I claim:

1. In a fuel injection apparatus for an internal combustion engine having an intake manifold provided with an air throttle, a fuel supply tank, a fuel injection pump structure ported for fuel intake and discharge and comprising a pump, a metering valve, control means for said metering valve, and a pump casing having a fuel inlet chamber connected with said fuel supply tank and with said fuel pump intake, said pump casing provided with a control chamber for housing said fuel metering control means and an intermediate chamber for housing said metering valve and vented to said control chamber, a fuel return line connecting the pump and tank, said intermediate chamber connected with said fuel return line, and means venting said control chamber to the engine intake manifold on the atmosphere side of the air throttle.

2. In a fuel injection apparatus for an internal combustion engine having an intake manifold provided with an air throttle, a fuel supply tank, a fuel injection pump structure ported for fuel intake and discharge and comprising a pump piston, a metering valve, control means for said metering valve and a casing having a fuel inlet chamber arranged to communicate with fuel pump intake, said casing provided with a control chamber for housing said fuel metering control means and an intermediate chamber for housing the metering valve and vented to said control chamber, a fuel line connecting the tank with the inlet chamber and including a low pressure fuel pump serving to supply fuel under pressure to said inlet chamber, a fuel return line connecting said fuel injection pump with the fuel tank, means connecting said intermediate chamber to said fuel return line, and a third conduit connecting said control chamber with said engine intake manifold on the atmospheres side of the air throttle whereby to vent the aforesaid control chamber, said intermediate chamber serving to collect vented fuel from the inlet chamber and fuel seeping past the fuel injection pump piston where said fuel can be drained to said fuel return line.

3. In a fuel injection apparatus for an internal combustion engine having an intake manifold provided with an air throttle, a fuel supply tank, a fuel injection pump structure ported for fuel intake and discharge and comprising a pump having a pump piston, a metering device, control means for said metering valve, and a pump casing having a fuel inlet chamber arranged to communicate with fuel pump intake, said casing provided with a control chamber for housing said fuel metering control means and an intermediate chamber for housing the metering valve and vented to said control chamber, a fuel line connecting the tank with the inlet chamber and including a low pressure fuel pump serving to supply fuel under pressure to said inlet chamber, a fuel return line connecting said fuel injection pump with the fuel tank, means connecting said intermediate chamber to said fuel return line, and a third conduit connecting said control chamber with said engine intake manifold on the atmosphere side of the air throttle whereby to vent the aforesaid control chamber, said intermediate chamber serving to collect vented fuel from the inlet chamber and fuel seeping past the fuel injection pump piston where said fuel can be drained to said fuel return line, and a passage in said casing connecting said fuel inlet chamber with fuel return line to provide an escape for fuel vapors that may collect in said inlet chamber.

4. In a fuel injection apparatus for an internal combustion engine having an intake manifold provided with an air throttle, a fuel supply tank, a fuel injection pump structure ported for fuel intake and discharge and comprising a pump having a pump piston, a metering valve, control means for said metering valve, and a casing having a fuel inlet chamber arranged to communicate with fuel pump intake, said casing provided with a control chamber for housing said fuel metering control means and an intermediate chamber for housing the metering valve and vented to said control chamber, a fuel line connecting the tank with the inlet chamber and including a low pressure fuel pump serving to supply fuel under pressure to said inlet chamber, a fuel return line connecting said fuel injection pump with the fuel tank, means connecting said intermediate chamber to said fuel return line, and a third conduit connecting said control chamber with said engine intake manifold on the atmosphere side of the air throttle whereby to vent the aforesaid control chamber, said intermediate chamber serving to collect vented fuel from the inlet chamber and fuel seeping past the fuel injection pump piston where said fuel can be drained to said fuel return line, said fuel return line and said control chamber vent conduit to the intake manifold constructed and arranged to serve as two-way conduits, whereby said fuel return line comprises a gravity line wherein heavier particles flow by gravity to said tank and vapors may rise therein and be discharged into said control chamber and thence to said intake manifold through control chamber vent conduit.

5. In a fuel injection apparatus for an internal combustion engine having an intake manifold, a fuel injection pump connected to and driven by said engine and comprising an injector casing, a fuel metering control mechanism comprising an angularly adjustable metering valve supported by the casing and operable to vary the fuel supplied to the engine, a movably supported pressure responsive member operable in direct response to variations in pressure in the engine intake manifold, a movably supported cam means connected to said pressure responsive member and operatively connected to said metering valve, a plurality of separately mounted guides for said cam, and separate means for adjusting each of said guides.

6. In a fuel injection apparatus for an internal combustion engine having an intake manifold, a fuel injection pump connected to and driven by said engine and comprising an injector casing, a fuel metering control mechanism comprising an angularly adjustable metering valve supported by the casing and operable to vary the fuel supplied to the engine, a movably supported pressure responsive member operable in direct response to variations in pressure in the engine intake manifold, a movably supported cam means connected to said pressure responsive member and operatively connected to said metering valve, a plurality of separately mounted guides for said cam, one of said guides connected with and operable to shift that part of said cam controlling full throttle fuel metering, said other of said guides connected with and operable to shift that part of said cam controlling idle throttle fuel metering, and separate means for adjusting each of said guides.

7. In a fuel injection apparatus for an internal combustion engine having an intake manifold, a fuel injection pump connected to and driven by said engine and comprising an injector casing, a fuel metering control mechanism comprising an angularly adjustable metering valve supported by the casing and operable to vary the fuel supplied to the engine, a movably supported pressure responsive member operable in direct response to variations in pressure in the engine intake manifold, a movably supported cam means connected to said pressure responsive member and operatively connected to said metering valve, a plurality of separately mounted guides for said cam, one of said guides connected with and operable to shift that part of said cam controlling full throttle fuel metering, said other of said guides connected with and operable to shift that part of said cam controlling idle throttle fuel metering and separate means for adjusting each of said guides, said adjusting means for said first mentioned guide comprising separate automatically actuated and manually actuated means, and said adjusting means for said second mentioned guide comprising manually actuated means.

8. In a fuel injection apparatus for an internal combustion engine having an intake manifold, a fuel injection pump connected to and driven by said engine and comprising an injector casing, a fuel metering control mechanism comprising an angularly adjustable metering valve supported by the casing and operable to vary the fuel supplied to the engine, a movably supported pressure responsive member operable in direct response to variations in pressure in the engine intake manifold, a movably supported cam means connected to said pressure responsive member and operatively connected to said metering valve, a plurality of separately mounted guides for said cam, one of said guides connected with and operable to shift that part of said cam controlling full throttle fuel metering, said other of said guides connected with and operable to shift that part of said cam controlling idle throttle fuel metering and separate means for adjusting each of said guides, said adjusting means for said first mentioned guide comprising separate automatically actuated and manually actuated means, and said adjusting means for said second mentioned guide comprising manually actuated means, the aforesaid automatically actuated adjusting means for said first mentioned guide comprising means operable in response to variations of both temperature and barometric pressures.

9. In a fuel injection apparatus for an internal combustion engine having an intake manifold, a fuel injection pump connected to and driven by said engine and comprising an injector casing, a fuel metering control mechanism comprising an angularly adjustable metering valve supported by the casing and operable to vary the fuel supplied to the engine, a movably supported pressure responsive member and operatively connected to said metering valve, a plurality of separately mounted guides for said cam, and separate means for adjusting each of said guides, both of said guides comprising members having grooves extending generally parallel to the direction of movement of said cam, said cam having a pin adjacent that portion of the cam operable for controlling full throttle adjustment of said metering valve and operable in the groove of said first mentioned guide, and said cam having a second pin adjacent that portion of the cam operable for controlling idle throttle adjustment of said metering valve and operable in the groove of said second mentioned guide.

10. In a fuel injection apparatus for an internal combustion engine having an intake manifold, a fuel injection pump connected to and driven by said engine and comprising an injector casing, a fuel metering control mechanism comprising an angularly adjustable metering valve supported by the casing and operable to vary the fuel supplied to the engine, a movably supported pressure responsive member operable in direct response to variations in pressure in the engine intake manifold, a movably supported cam means connected to said pressure responsive member and operatively connected to said metering valve, a plurality of separately mounted guides for said cam, one of said guides connected with and operable to shift that part of said cam controlling full throttle fuel metering, said other of said guides connected with and operable to shift that part of said cam controlling idle throttle fuel metering and separate means for adjusting each of said guides, said adjusting means for said first mentioned guide comprising separate automatically actuated and manually actuated means, and said adjusting means for said second mentioned guide comprising manually actuated means, the aforesaid automatically actuated adjusting means for said first mentioned guide comprising means operable in response to variations of both temperature and barometric pressures, and comprising linkage including a temperature responsive member and adjustable means for mounting said linkage.

11. In a fuel injection apparatus for an internal combustion engine having an intake manifold, a fuel injection pump connected to and driven by said engine and comprising an injector casing, a fuel metering control mechanism comprising an angularly adjustable metering valve supported by the casing and operable to vary the fuel supplied to the engine, a movably supported pressure responsive member operable in direct response to variations in pressure in the engine intake manifold, a movably supported cam means connected to said metering valve, a plurality of separately mounted guides for said cam, one of said guides connected with and operable to shift that part of said cam controlling full throttle fuel metering, said other of said guides connected with and operable to shift that part of said cam controlling idle throttle fuel metering and separate means for adjusting each of said guides, said adjusting means for said first mentioned guide comprising separate automatically actuated and manually actuated means, and said adjusting means for said second mentioned guide comprising manually actuated means, the aforesaid automatically actuated adjusting means for said first mentioned guide comprising means operable in response to variations of both temperature and barometric pressures, and comprising linkage including a temperature responsive member and adjustable means for mounting said linkage, the last mentioned adjustable means manually controlled by the operator of said engine.

12. In a fuel injection apparatus for an internal combustion engine having an intake manifold, a fuel injection pump connected to and driven by said engine and comprising an injector casing, a fuel metering control mechanism comprising an angularly adjustable metering valve supported by the casing and operable to vary the fuel supplied to the engine, a movably supported pressure responsive member operable in direct response to variations in pressure in the engine intake manifold, a movably supported cam means connected to said metering valve, a plurality of separately mounted guides for said cam, one of said guides connected with and operable to shift that part of said cam controlling full throttle fuel metering, said other of said guides connected with and operable to shift that part of said cam controlling idle throttle fuel metering and separate means for adjusting each of said guides, said adjusting means for said first mentioned guide comprising separate automatically actuated and manually actuated means, and said adjusting means for said second mentioned guide comprising manually actuated means, the aforesaid automatically actuated adjusting means for said first mentioned guide comprising means operable in response to variations of both temperature and barometric pressures, and comprising linkage including a temperature responsive member and adjustable means for mounting said linkage, the last mentioned adjustable means manually controlled by the operator of said engine, and comprising an adjustably mounted lever means externally positioned with respect to said injector casing.

13. In a fuel injection apparatus for an internal combustion engine having an intake manifold, a fuel injection pump connected to and driven by said engine and comprising an injector casing, a fuel metering control mechanism comprising an angularly adjustable metering valve supported by the casing and operable to vary the fuel supplied to the engine, a movably supported pressure responsive member operable in direct response to variations in pressure in the engine intake manifold, a movably supported cam means connected to said pressure responsive member and operatively connected to said metering valve, a plurality of separately mounted guides for said cam, one of said guides connecting with and operable to shift that part of said cam controlling full throttle fuel metering, said other of said guides connected with and operable to shift that part of said cam controlling idle throttle fuel metering, and separate means for adjusting each of said guides, said adjusting means for said first mentioned guide comprising an automatically actuated means and a separate manually actuated means, and said adjusting means for the second mentioned guide comprising a manually actuated means, the aforesaid automatically actuated adjusting means for said first mentioned guide comprising means actuated in response to variations of both temperature and barometric pressures, and including linkage and adjustable means for mounting said linkage, the last mentioned adjustable means having a range of such extent as to provide an adjustment encompassing the extreme rich and lean limits of the automatic means.

14. In a fuel injection apparatus for an internal combustion engine having an intake manifold, a fuel injection pump connected to and driven by said engine and comprising an injector casing, a fuel metering control mechanism comprising an angularly adjustable metering valve supported by the casing and operable to vary the fuel supplied to the engine, a movably supported pressure responsive member operable in direct response to variations in pressure in the engine intake manifold, a movably supported cam means connected to said metering valve, a plurality of separately mounted guides for said cam, one of said guides connected with and operable to shift that part of said cam controlling full throttle fuel metering, said other of said guides connected with and operable to shift that part of said cam controlling engine-idling fuel metering, and separate means for adjusting each of said guides, said adjusting means for the second mentioned guide comprising manually actuated means to selectively incline or shift the guide, said adjustment means for first mentioned guide acting to angularly adjust the said guide about a pivotal point located at the end of the guide opposite to connection therewith of said adjustment means corresponding to normal position of the cam in idling position, so that altitude curves for full throttle fuel delivery are substantially tangent at the idling ends with sea-level curves for full throttle fuel delivery, which means that idling quantity is reduced a lesser percentage at higher altitudes.

15. In a fuel injection apparatus for an internal combustion engine having an intake manifold, a fuel injection pump connected to and driven by said engine and comprising an injector casing, a fuel metering control mechanism comprising an angularly adjustable metering valve supported by the casing and operable to vary the fuel supplied to the engine, a movably supported pressure responsive member operable in direct response to variations in pressure in the engine intake manifold, a movably supported cam means connected to said metering valve, a plurality of separately mounted guides for said cam, one of said guides connected with and operable to shift that part of said cam controlling full throttle fuel metering, said other of said guides connected with and operable to shift that part of said cam controlling engine-idling fuel metering, and separate means for adjusting each of said guides, said adjusting means for the second mentioned guide comprising manually actuated means to selectively incline or shift the guide, said adjustment means for first mentioned guide acting to angularly adjust the said guide about a pivotal point located at the end of the guide opposite to connection therewith of said adjustment means corresponding to normal position of the cam in idling position, so that altitude curves for full throttle fuel delivery are substantially tangent at the idling ends with sea-level curves for full throttle fuel delivery, which means that idling quantity is reduced a lesser percentage at higher altitudes, said pivotal point of support for said first mentioned guide being located at a preselected point whereby to provide for a fanning out of said altitude curves from a predetermined point near the engine idling end of said curves.

16. A method of achieving substantially correct calibration of the fuel delivery in a fuel injection engine having fixed orifice fuel injection nozzles and a fuel pump for delivering metered fuel to said engine, throughout the speed and load range of said engine, consisting in initially determining the fuel requirements of the engine for a selected speed, in calibrating a metering control for said pump in accordance with said fuel requirements as thus determined to fix a fuel delivery curve, and in modulating the inclination or declination of said fuel delivery curve by respectively adjusting the porting of the pump delivery with relation to the rise and fall of the pressure wave of the discharging fuel on initial assembly of the injector structure with said engine.

References Cited in the file of this patent
UNITED STATES PATENTS 2,455,571    Edwards _____ Dec. 7, 1948
2,641,238    Roosa _____ June 9, 1953